United States Patent
Steinman et al.

(10) Patent No.: US 12,420,685 B2
(45) Date of Patent: Sep. 23, 2025

(54) THERMAL CONTROL USING REPEATED THERMORECEPTOR STIMULATION

(71) Applicant: GENTHERM INCORPORATED, Northville, MI (US)

(72) Inventors: Adam Joseph Steinman, Ferndale, MI (US); James Francis Gallagher, Walled Lake, MI (US)

(73) Assignee: GENTHERM INCORPORATED, Novi, MI (US)

( * ) Notice: Subject to any disclaimer, the term of this patent is extended or adjusted under 35 U.S.C. 154(b) by 929 days.

(21) Appl. No.: 17/570,491

(22) Filed: Jan. 7, 2022

(65) Prior Publication Data

US 2022/0242286 A1 Aug. 4, 2022

Related U.S. Application Data

(60) Provisional application No. 63/143,200, filed on Jan. 29, 2021.

(51) Int. Cl.
*B60N 2/56* (2006.01)
*H05B 1/02* (2006.01)

(52) U.S. Cl.
CPC ......... *B60N 2/5678* (2013.01); *B60N 2/5657* (2013.01); *H05B 1/0238* (2013.01); *H05B 2203/029* (2013.01)

(58) Field of Classification Search
CPC .. B60N 2/5657; B60N 2/5678; H05B 1/0236; H05B 1/0238; H05B 2203/029
USPC ....................................................... 219/217
See application file for complete search history.

(56) References Cited

U.S. PATENT DOCUMENTS

| | | | |
|---|---|---|---|
| 4,740,664 A * | 4/1988 | Payne | H05B 3/74 219/460.1 |
| 6,211,494 B1 * | 4/2001 | Giamati | B64C 1/1453 244/129.1 |
| 10,351,029 B2 | 7/2019 | Ziolek et al. | |
| 2012/0312520 A1 * | 12/2012 | Hoke | B60N 2/5628 219/217 |
| 2013/0134150 A1 | 5/2013 | Mizuno et al. | |
| 2016/0304013 A1 * | 10/2016 | Wolas | B60N 2/5657 |
| 2017/0129499 A1 * | 5/2017 | Odate | B60W 60/0053 |
| 2018/0118064 A1 * | 5/2018 | Sato | B60N 2/0025 |
| 2018/0257253 A1 * | 9/2018 | Vandergon | B26F 3/004 |
| 2019/0257861 A1 * | 8/2019 | Breitlow | H01L 21/67248 |

(Continued)

OTHER PUBLICATIONS

Ziolek et al. Heated Seat Simulation Study for Thermal Seat Comfort Improvement, vol. 8, Issue 2 (Jul. 2015).

(Continued)

*Primary Examiner* — Steven W Crabb
*Assistant Examiner* — Ket D Dang
(74) *Attorney, Agent, or Firm* — The Dobrusin Law Firm, P.C.

(57) ABSTRACT

A method that includes supplying an amount of power to a thermal system to effect a temperate change of a touch surface; determining a rate of the temperature change of the touch surface; comparing the determined rate of the temperature change to a predetermined rate threshold; and changing the amount of power supplied to the thermal system after the comparing step based on whether the determined rate of temperature change is less than or greater than the predetermined rate threshold.

16 Claims, 5 Drawing Sheets

(56) References Cited

U.S. PATENT DOCUMENTS

2020/0033664 A1* 1/2020 Kanematsu ............. B60R 16/03
2020/0276922 A1* 9/2020 Muramatsu ............. H05B 3/34

OTHER PUBLICATIONS

Ziolek; Reduced Power Seat Heater System Using Thermal Wave Technology, vol. 2, Issue 3, (2020).

* cited by examiner

THERMAL CONTROL USING REPEATED THERMORECEPTOR STIMULATION

PRIORITY

This application claims priority to U.S. 63/143,200 filed on Jan. 29, 2021, the contents of which is expressly incorporated by reference herein for all purposes.

FIELD

These teachings relate to a thermal system and a control method for heating and/or cooling one or more surfaces.

BACKGROUND

Some vehicles include one or more features for improving occupant comfort. For example, some vehicle seats include one or more heating systems and/or cooling systems for warming and/or cooling a vehicle occupant. An exemplary system is disclosed in U.S. Pat. No. 10,351,029, which is incorporated by reference herein for all purposes.

In a conventional vehicle seat heating system, a feedback loop may be used to heat the vehicle seat. Generally, when power is supplied to the heating system, occupant thermoreceptors may sense the temperature increase, which may positively affect or enhance occupant thermal comfort. After a high target or threshold temperature is reached, a supply of power to the heating system may be reduced or terminated, which may cause the seat temperature to decrease. The thermoreceptors may sense the temperature decrease, which may negatively affect occupant thermal comfort. Then, after a low target or threshold temperature is reached, power may be increased or again supplied to the heating system, causing the vehicle seat to warm up, which may be sensed by the thermoreceptors and positively effect or enhance occupant thermal comfort.

Similarly, when power is supplied to a conventional cooling system of a vehicle seat, the thermoreceptors may sense a temperature reduction, which may positively affect or enhance occupant thermal comfort. After a low target or threshold temperature is reached, power to the heating system may be reduced or terminated, which may cause the seat temperature to increase. The thermoreceptors may sense the temperature increase, which may negatively affect occupant thermal. After a high target or threshold temperature is reached, power may be increased or again supplied to the cooling system, causing the vehicle seat to cool down again, which may be sensed by the thermoreceptors and positively effect or enhance occupant thermal comfort of the occupant.

Studies have shown that human thermoreceptors are excited by rapid changes in temperature and do not react to slow changing temperatures. Thermoreceptors will not signal after acclimating to a steady state temperature. For example, when an occupant is in contact with a touch surface of a vehicle that has a slow-changing temperature, thermal acclimation may occur, and the occupant may not sense the temperature change.

Accordingly, while operating in the heating mode, it may be desirable to have a thermal system and/or control method that detects and/or adjusts the rate at which the temperature of the vehicle seat is reduced or cooled to prevent the thermoreceptors from detecting the negative temperature change so that occupant thermal comfort is not negatively affected.

Accordingly, while operating in a cooling mode, it may be desirable to have a thermal system and/or control method that detects and/or adjusts the rate at which the temperature of the vehicle seat is increased to prevent the thermoreceptors from detecting the positive temperature change so that occupant thermal comfort is not negatively affected.

SUMMARY

These teachings provide a thermal system and/or control method that meets one or more of the needs discussed above.

While operating in a heating mode, the thermal system and/or control method according to these teachings is configured to detect and adjust the rate at which a touch surface temperature is increased to allow the thermoreceptors to detect the temperature change. While operating in a heating mode, the thermal system and/or control method according to these teachings is configured to detect and/or adjust the rate at which the temperature of the vehicle seat is reduced or cooled to prevent the thermoreceptors from detecting the negative temperature change.

While operating in a cooling mode, the thermal system and/or control method according to these teachings is configured to detect and then adjust the rate at which a touch surface temperature is cooled to allow the thermoreceptors to detect the temperature change. While operating in a cooling mode, the thermal system and/or control method according to these teachings is configured to detect and/or adjust the rate at which the temperature of the vehicle seat is increased to prevent the thermoreceptors from detecting the positive temperature change.

The thermal system and/or control method according to these teachings may advantageously allow for reduced power levels to be supplied to heating and/or cooling systems, without human thermoreceptors detecting temperature changes associated with operating the heating and/or cooling systems with reduced power levels. This may advantageously reduce vehicle operating costs and/or may increase vehicle range, for example, for various hybrid and/or electric vehicles.

The thermal system and/or control method according to these teachings may advantageously contribute to power savings by not requiring a continuous power level to be supplied to the heating and/or cooling system. This may advantageously reduce vehicle operating costs and may increase vehicle range, for example, in the case of certain hybrid and/or electric vehicles.

The thermal system and/or control method according to these teachings may repeatability stimulate human thermoreceptors to prevent acclimation from occurring, which may advantageously increase occupant thermal comfort.

The thermal system and/or control method according to these teachings may supply power to a heating and/or cooling system so that the system reaches a target temperature as quickly as possible. Once or after the target temperature is reached, the thermal system and/or control method is configured to control, tune, or modulate (e.g., via pulse width modulation) the power supplied to the heating and/or cooling system to control the rate at which the temperature of the touch surface moves away from the target temperature so that the human thermoreceptors do not detect the temperature change. For example, the rate at which the temperature of the touch surface moves away from the target temperature may be controlled to a rate of approximately 0.2° C./min. This rate may be faster or slower. The rate may be tuned to occupant preferences. Once or after the temperature of the touch surface has sufficiently moved away from the target temperature, for example about 0.5° C. or more, the thermal system and/or control method may be configured to supply or increase power the heating and/or cooling system to again reach the target temperature, preferably as quickly as possible. The aforementioned 0.5° C. temperature may be higher or lower and/or may be turned to occupant preferences. This process may be repeated, which may advantageously create repeated thermal sensation without acclimation, while also preventing undesired sensations associated with sensing temperature changes, normally felt when the heating and/or cooling system cycles off.

The method according to these teachings may include one more steps that include: supplying an amount of power to a thermal system to effect a temperate change of a touch surface; determining a rate of the temperature change of the touch surface; comparing the determined rate of the temperature change to a predetermined rate threshold; changing the amount of power supplied to the thermal system after the comparing step based on whether the determined rate of temperature change is less than or greater than the predetermined rate threshold.

The method may include: increasing the power if the determined rate of temperature change is less than the predetermined rate threshold; decreasing the power if the determined rate of temperature change is not less than the predetermined rate threshold; : turning ON the thermal system, and the supplying step comprises: suppling a first power level to the thermal system and then supplying a second power level to the thermal system that is different than the first power level; detecting a temperature of the touch surface and comparing the detected temperature to a predetermined temperature threshold; decreasing the first power level to the second power level if the detected temperature is greater than or equal to the predetermined temperature threshold; decreasing the first power level to the second power level if the detected temperature is less than or equal to the predetermined temperature threshold; detecting a second temperature of the touch surface after the second power level is supplied to the thermal system and comparing the detected second temperature to a second predetermined temperature threshold; continuing to supply the second power level to the thermal system if the detected second temperature is greater than or equal to the second predetermined temperature threshold; terminating the second power level supply to the thermal system if the detected second temperature of the touch surface is less than or equal to the second predetermined temperature threshold; supplying the first power level supply to the thermal system; the first detected temperature of the touch surface and the second detected temperature of the touch surface are used in the step of determining the rate of the temperature change; the second power level is increased after the determining step if the rate of the temperature change is less than the predetermined rate threshold; the second power level is decreased after the determining step if the rate of the temperature change is greater than the predetermined rate threshold; setting a timer and monitoring an elapsed time; comparing the elapsed time to a predetermined time period and terminating the second power level supply to the thermal system if the elapsed time exceeds the predetermined time; comparing of the elapsed time to the predetermined time occurs before the step of determining the rate of the temperature change of the touch surface; the second power level is 40% pulse width modulated. A vehicle and/or vehicle seat may comprise the touch surface and the thermal system is configured to effect the temperate change of the touch surface.

DETAILED DESCRIPTION

Figure 1:
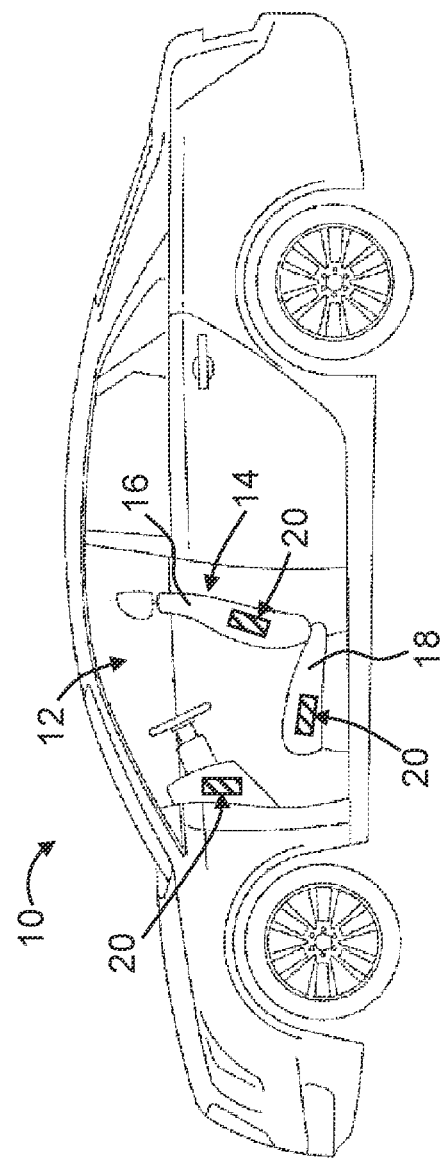
FIG. 1 shows a vehicle that includes one or more thermal systems.

The vehicle may be any vehicle. For example, the vehicle may be an automobile, a recreational vehicle, a train, an airplane, a boat, and the like. The vehicle may include one or more of the thermal systems disclosed herein. The vehicle may include one or more vehicle seats. The vehicle, the vehicle seat, or both may include one or more touch surfaces. The one or more touch surfaces may be located inside of the vehicle, for example within a cabin or cockpit of the vehicle.

The touch surface may be virtually any surface that may be touched or contacted. The touch surface may be a surface that an occupant or user may come into contact with intentionally or unintentionally (i.e., by accident). The touch surface may be located inside of a vehicle. The touch surface may be part of one or more of the vehicle seats, a dashboard, a steering wheel, a center counsel, cup holder, one or more door panels, the headliner, one or more floor mats, etc. The touch surface may be a flat, generally planar surface, or the touch surface may be a surface having more than one contour or dimension. The touch surface may be a class "A-surface" or an "A-side" that includes color, grain, or other artistic or decorative features. The touch surface may be made of virtually any material or combination of materials. For example, the touch surface may be or may comprise plastic, wood, rubber, metal, cloth, leather, vinyl, fabric, laminate, composite, woven or non-woven materials, flocking, canvas, the like, or a combination thereof. The touch surface may be any surface inside or outside of the vehicle.

The touch surface may be or inside or outside of any non-vehicular applications. For example, the touch system may be part of a couch, recliner, or other surface a human may touch or contact inside of a residence, office building, hotel, restaurant, etc.

The thermal system disclosed herein may be incorporated into vehicular and non-vehicular applications. The thermal system may function to change a temperature of one or more touch surfaces. The thermal system may function to increase, decrease, or maintain a temperature of the one or more touch surfaces. The thermal system may comprise a heating system, a cooling system, or both.

The thermal system may function to run or execute the control method according to these teachings. The control system may comprise one or more processors, memories, controllers, look up tables, algorithms, formulas, programs, commands, or a combination thereof.

A controller may be any hardware device. The controller may include a memory and a processor. The memory may be configured to store the control method disclosed herein. The memory may store program instructions, algorithms, look up tables, formulas, programs, commands, etc. The controller and/or processor may be programmed or enabled to execute or run the control method disclosed herein. The controller and/or processor may execute one or more of the method steps disclosed herein, including performing calculations, measurements, comparisons, determinations, sensing functions, turning the heating system on/off, turning the cooling system on/off, increasing a power supply to one or more of the heating/cooling/thermal systems, decreasing a power supply to the one or more heating/cooling/thermal systems, etc. The controller and/or processor may function to make decisions based on any of the method steps discussed herein. The controller and/or processor may monitor the heating/cooling/thermal system for abnormalities. The controller and/or processor may signal an error (audible, visible alarm, error code) if an abnormality is detected. For example, the controller and/or processor may signal an error if the touch surface is heating or cooling too rapidly, not rapidly enough, or not at all. The controller and/or processor may signal an error if one or more sensors malfunction or are unable to capture a measurement or if a calculation cannot be performed.

The thermal system, the controller, and/or processor may be reprogrammed by a user or OEM or aftermarket if an update or program change is necessary.

The thermal system, the controller, and/or processor may communicate via wires or wireless communication (cellular, Bluetooth®, Wi-Fi, etc.). The thermal system, the controller, and/or processor may communicate over a vehicle CAN bus or other like interface communication system.

The controller may be embodied as non-transitory computer readable media on a computer readable medium containing executable program instructions or method steps executed by a processor, controller, or the like. Examples of the computer readable mediums include, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The thermal system may be a separate system that is part of the touch surface or the assembly of the touch surface. For example, the thermal system may be part of a vehicle seat. Alternatively, the thermal system may be part of the vehicle or vehicle HVAC system and may function to thermally control one or more vehicle features like one or more vehicle seats, dashboard, steering wheel, cupholder, headliner, floor mats, door panels, center console, etc. The thermal system may control more than one vehicle feature. For example, a thermal system may control two or more vehicle seats and may be capable of running one or more control methods according to these teachings to thermally control the two or more vehicle seats. A vehicle may include more than one thermal system, to individually control a vehicle feature.

The thermal system may include one or more power supplies. The power supply may function to generate and/or supply power to the one or more thermal systems. The power supply may supply electricity to the one or more thermal systems, heating system, cooling systems, or a combination thereof. The power supply may function to provide power to the heating system, the cooling system, or both, to thermally effect the tough surface. The power supply may be one or more batteries, a vehicle engine, a vehicle alternator, a wall outlet (i.e., 120V, 220V, supply), a solar panel, etc. The power supply may be a power supply having a range of about 10.5-16.5 volts. The power supply may be a dedicated supply for only the one or more thermal systems. The power supply may be a shared supply for other vehicle elements, like the radio, clock, GPS, headlights, etc.

The thermal system may comprise one or more heating systems. The heating system may be part of the thermal system that is specific to the one or more elements being warmed. Alternatively, the heating system may be part of a greater system, such as the vehicle, and the one or more touch surfaces may utilize the heating system of the greater system to heat the touch surface. A heating system may function to heat or increase a temperature of the one or more touch surfaces. The heating system may comprise a heating coil placed beneath the touch surface, for example below a seat cover of the vehicle seat. The heating coil may be an elongated element of wire through which electricity passes. The heating coil acts as a resistor that resists the electricity flowing therethrough. The resistance creates energy that is turned into heat, which causes an adjacent one or more touch surfaces to heat up. Typically, an increase in power or electricity supplied to the heating system or heating coil causes an increase in heat. A decrease in power or electricity supplied to the heating system or heating coil causes a decrease in heat. The heating system may include one or more fans to disperse the heat to or along the touch surface.

The thermal system may comprise one or more cooling systems. The cooling system may be part of the thermal system that is specific to the one or more elements being cooled. Alternatively, the cooling system may be part of a greater system, such as the vehicle, and the one or more touch surfaces may utilize the cooling system of the greater system to cool the touch surface. A cooling system may function to cool or decrease a temperature of the one or more touch surfaces. A cooling system may include a refrigerant or may be free of a refrigerant. A cooling system may include one or more fans that produce air circulation, which blows to the one or more touch surfaces that creates a cooling effect on the touch surface. An increase in power or electricity supplied to the cooling system causes a decrease in temperature. A decrease in power or electricity supplied to the cooling system causes an increase in temperature. The cooling system may include an air conditioner. The air conditioner may comprise a refrigerant or gas. The air conditioner may comprise a compressor and an expansion device or valve. The refrigerant or gas may be compressed and expanded. The air conditioner may comprise a compression, condensation, expansion cycle.

The thermal system may include one or more sensors. The one or more sensors may function to measure a temperature of the one or more touch surfaces; a temperature of the environment surrounding the one or more touch surfaces; a humidity of the environment surrounding the one or more touch surfaces; an output temperature from the one or more heating systems and/or cooling systems; a power level being supplied to the one or more heating systems and/or cooling systems; a power level being consumed by the one or more heating systems, cooling systems, thermal systems, a fan speed of one or more fans or air movers; presence or absence of an occupant; contact or absence of contact of the one or more touch surfaces by an occupant; a weight of one or more occupants; an elapsed time during a heating cycle, a cooling cycle, a power savings cycle, a PWM cycle; or a combination thereof. The one or more sensors may include: one or more thermometers, thermostats, timers, contact sensors, presence sensors, hygrometers, power meters, the like, or a combination thereof.

The one or more sensors may be located or embedded below the touch surface. For example, the touch surface may be an "A-side" surface and the one or more sensors may be attached to the opposing "B-side" of the touch surface. However, in some configurations, it is conceivable for the one or more sensors to be embedded in the A-side, within a thickness of the touch surface (i.e., between the A-and B-side). In other configurations, the one or more sensors may be spaced apart from the A- and/or B-side of the touch surface. The one or more sensors may be incorporated into an insulation or other material located adjacent to or in contact with the touch surface. For example, in vehicle seat applications, the one or more sensors may be attached to the foam bun or suspension. The one or more sensors may be located anywhere inside or outside of the vehicle. The one more touch sensors may be located anywhere relative to the touch surface. The one or more sensors may be sensors that are used for other sensing operations, like sensing presence or absence of an occupant, sensing air pressure, vehicle speed, temperatures outside of the vehicle, temperature inside of the vehicle, power levels, occupant pre-set conditions, or a combination thereof.

A vehicle 10 is shown in FIG. 1. The vehicle 10 comprises an interior or cabin 12 comprising one or more vehicle seats 14. The vehicle seat 14 may include a back rest portion 16 and a seating portion 18. The vehicle 10 and/or the vehicle seat 14 may include one or more thermal systems 20. A thermal system 20 may function to heat or cool one or more touch surfaces of the vehicle 10 and/or the vehicle seat 14. The one or more touch surfaces may be any surface(s) of the vehicle 10 that an occupant may touch, contact, or come into close contact with, including, but not limited to surfaces associated with: one or more regions of a vehicle seat 14, the dashboard, the steering wheel, a center console, one or more cup holders, one or more door panels, the headliner, one or more floor mats, windows, etc.

Figure 2:
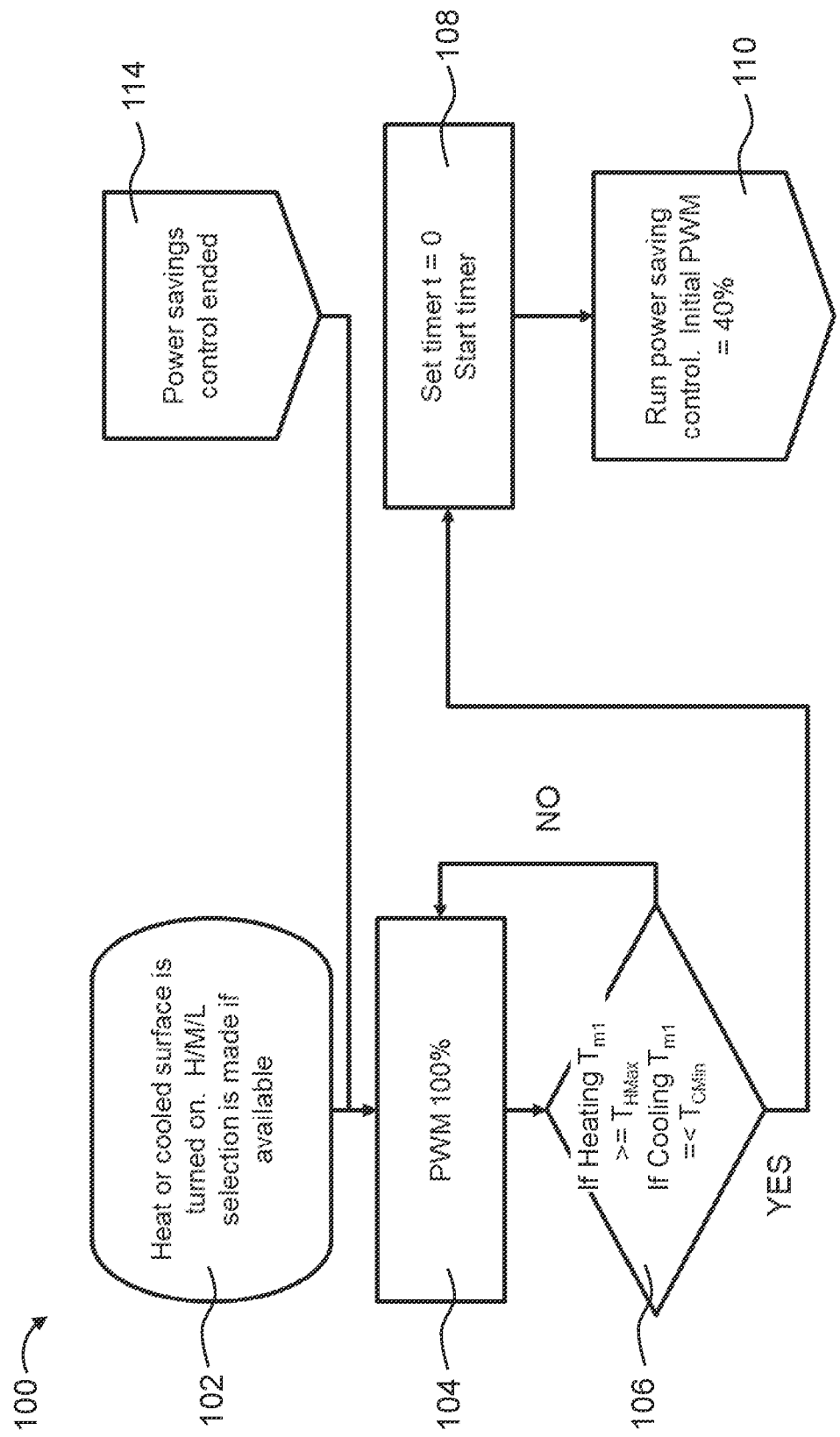
FIG. 2 shows a method used in a thermal system.
Figure 3:
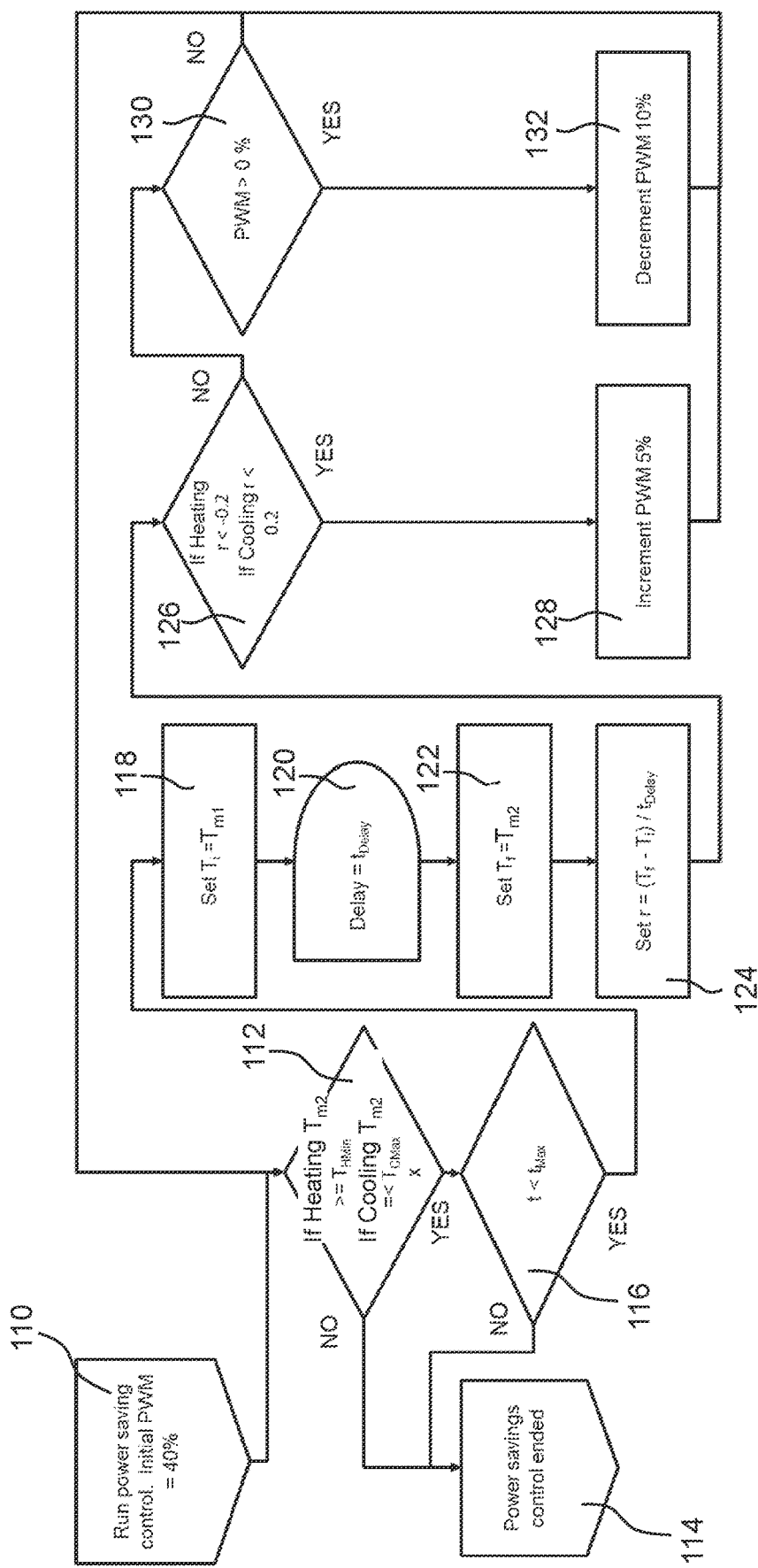
FIG. 3 shows a method used in a thermal system.

FIGS. 2 and 3 illustrate a control method 100. The control method 100 may be part of the one or more thermal systems 20. The control method 100 may be part of the computer architecture of the vehicle 10, for example located within the vehicle ECU. The control method 100 may be part one or more of the vehicle components, like a vehicle seat 14, the dashboard, the steering wheel, a center console, one or more cup holders, one or more door panels, the headliner, one or more floor mats, etc. The thermal system 20 and/or control method 100 may function to improve or increase occupant comfort, save vehicle operating costs, save or reduce power consumption, and/or improve vehicle operating range and performance.

It is understood that one or more of the steps described in the control method 100 can be omitted, duplicated, rearranged with one or more other method steps, combined with one or more method steps, and/or substituted with one or steps. One or more of the control method steps illustrated and described herein may be split into one or more sub steps, which may then be omitted, duplicated, rearranged, and/or combined with one or more other method steps and/or sub steps. The one or more steps may be performed in virtually any order.

The control method 100 may include a step 102. In or during step 102, the thermal system 20 may be turned ON or activated. In step 102, an amount of power may be supplied or increased to the thermal system 20, the heating system, the cooling system, or a combination thereof. In step 102, the amount power supplied to the thermal system 20, the heating system, the cooling system, or a combination thereof may be increased compared to a previous power supply level or amount of power first supplied. In step 102, the heating and/or cooling system may be activated but power may not be supplied thereto, or the power supplied to the heating and/or cooling system may be below a predetermined threshold. In step 102, a user may select the mode or intensity of the thermal system. The available intensities may include one or more modes, such as a High mode, Medium mode, and a Low mode. High mode means the target temperature of touch surface will be warmed or cooled more than in the Low mode. Medium mode means the target temperature of the touch surface will be warmed or cooled to a target temperature between High mode and Low mode. As will be described further below, the high and low target or threshold temperatures may be different for each of the aforementioned modes High, Medium, and Low. This advantageously provides the ability for the occupant to select how warm or cold the touch surface is to be conditioned, to increase and personalize occupant comfort.

Step 102 may occur automatically after the vehicle 10 is started or turned ON. Step 102 may occur after the vehicle 10 and/or the vehicle seat 14 detect presence of one or more occupants and/or a touch surface is touched or contacted by one or more occupants. For example, the vehicle 10, the vehicle seat 14, and/or the thermal system 20 may include one or more occupant detection sensors that detect presence and/or touch by an occupant. Step 102 may occur after a button or switch inside or outside of the vehicle 10 is activated, or after button or switch on a remote or key FOB is activated. Step 102 may occur after a temperature of one or more elements or surfaces of the vehicle 10 fall below a predetermined temperature threshold and/or after a temperature of one or more elements or surfaces of the vehicle 10 raise above a predetermined temperature threshold. Step 102 may occur via voice activation (i.e., a vehicle occupant or user instructs the step to begin or occur. Step 102 may be activated via Bluetooth, for example, if the vehicle computer or control module detects presence of an object, such as a control activated watch, mobile device, or other wearable technology.

The control method 100 may include a step 104. In or during step 104, the control method may supply or increase a power supply to the thermal system 20. In step 104, the power may be increased or modulated by Pulse width modulation (PWM). In step 104, the power supply or amount of power may be increased or modulated to a sufficient level to cause a temperature of the touch surface to change. For example, the temperature of the touch surface may increase (if operating in a heating mode) or the temperature may decrease (if operating in a cooling mode). For example, the power level may be increased or modulated to 10% or more, 20% or more, 30% or more, 40% or more, 50% or more, 60% or more, 70% or more, 80% or more, 90% or more, or to 100%. During step 104, the temperature of the touch surface may quickly or rapidly increase if operating in a heating mode. During step 104, the temperature of the touch surface may quickly or rapidly decrease if operating in a cooling mode. The rate at which the temperature may increase or decrease during step 104 may be about 5 to 15° C./min. However, the temperature change rate may be higher or lower during step 104 and/or the range may be smaller or larger, depending on the specific application for the thermal system, how thermal system is tuned, occupant preferences, safety standards, etc.

The control method 100 may include a step 106. In or during step 106, the control method 100 or thermal system 20 includes a sub step that is configured to measure or detect a surface temperature ($T_{m1}$) of the touch surface. The one or more sensors used to measure, detect, or determine the surface temperature ($T_{m1}$) of the touch surface may be located or embedded in or below the touch surface. For example, the touch surface may be an "A-side" surface and the one or more sensors may be attached to the opposing "B-side" of the touch surface or spaced apart from the B-side of the touch surface. However, in some configurations, it is conceivable for the one or more sensors to be embedded in the A-side, within a thickness of the touch surface (i.e., between the A-and B-side). In other configurations, the one or more sensors may be spaced apart from the A- and/or B-side of the touch surface. In some configurations, the one or more sensors may be part of the touch surface assembly (i.e., part of a heating mat or heating system). The one or more sensors may be located anywhere in or relative to the vehicle or the touch surface and still be within the spirt of this disclosure. The measured or detected surface temperature ($T_{m1}$) of the touch surface may be the temperature of the touch surface during or after the touch surface has been heated or cooled with the corresponding heating system or cooling system using the applied power level from step 104. The control method 100 or thermal system 20 may perform this measurement, detection, and/or determination with a timer, thermometer, thermostat, power supply, look up table, algorithm, computer software, or a combination thereof. The control method 100 or thermal system 20 may perform this measurement, detection, and/or determination after a preset time period expires or elapses after step 104 begins. The control method 100 or thermal system 20 may perform this measurement, detection, and/or determination at the same time step 104 is performed.

If operating in a heating mode, the step 106 also includes a sub step of comparing the measured or detected surface temperature ($T_{m1}$) to a maximum threshold heating temperature ($T_{HMax}$). The maximum threshold heating temperature ($T_{HMax}$) may be a predetermined high temperature that should not be exceeded for longer than a predetermined amount of time to prevent occupant burn, occupant thermal discomfort, and/or an excessive power draw or depletion. The maximum threshold heating temperature ($T_{HMax}$) may be stored in a memory of the vehicle control module, the control module of the of the thermal system 20, or both. The comparing step may be performed by one or more processors of the vehicle, the thermal system 20, or both.

If it is determined during step 106 that the measured or detected surface temperature ($T_{m1}$) is not greater than or equal to the maximum threshold heating temperature ($T_{HMax}$), then the control method 100 reverts back to step 104, where the power continues to be supplied. The power level from step 104 may be maintained or increased from the previous supply level. On the other hand, if it is determined that the measured or detected surface temperature ($T_{m1}$) is greater than or equal to the maximum threshold heating temperature ($T_{HMax}$), then the control method 100 proceeds to step 108.

If operating in a cooling mode, the step 106 includes a sub step of comparing the measured or detected surface temperature ($T_{m1}$) to a minimum threshold cooling temperature ($T_{CMin}$). The minimum threshold cooling temperature ($T_{CMin}$) may be a predetermined low temperature that should not be exceeded for longer than a predetermined amount of time to prevent occupant thermal discomfort and/or an excessive power draw or depletion. The minimum threshold cooling temperature ($T_{CMin}$) may be stored in a memory of the vehicle control module, the control module of the of the thermal system 20, or both. The comparing step may be performed by one or more processors of the vehicle, the thermal system 20, or both.

If it is determined during step 106 that the measured or detected surface temperature ($T_{m1}$) is not less than or equal to the minimum threshold cooling temperature ($T_{CMin}$), then the method 100 reverts back to step 104, where the power level continues to be supplied. The power level from step 104 may be maintained or increased from the previous supply level. On the other hand, if it is determined that the measured or detected surface temperature ($T_{m1}$) is less than or equal to the minimum threshold cooling temperature ($T_{CMin}$), then the control method 100 proceeds to step 108.

The control method 100 may include a step 108. In or during step 108, the method 100 may start or activate a timer. The timer may be part of a time-out routine that functions to override a power savings operation, which may begin at step 110. The timer in step 108 may be optional, or the timer may be activated at a different part of the method 100, for example after step 110. The timer may be part of the vehicle, the thermal system 20, or both The control method 100 may include a step 110. In or during step 110, the control method 100 may include running a power savings mode or operation. In or during the power savings mode or operation, the power level supplied to the thermal system 20 is decreased relative to the power level that is/was supplied to the thermal system 20 at step 104. In or during the power savings mode or operation, the power level supplied to the thermal system 20 is reduced or decreased so that the temperature of the touch surfaces moves away from the measured or detected surface temperature ($T_{M1}$) that was measured or detected above at step 106. For example, if operating in a heating mode, the power level is reduced, decreased, and/or modulated so that the temperature of the surface drops or is reduced. If operating in a cooling mode, the power level is reduced, decreased, or modulated so that the temperature of the surface increases. The power level should be decreased a sufficient amount to allow the temperature to change. Preferably, the power level should be decreased a sufficient amount so that the temperature does not change rapidly, so that the occupant or human therm oreceptors do not detect or respond to the temperature change. The amount that the power supply level is reduced or decreased may depend on the structure and/or materials of the touch surface or the assembly thereof. For example, the power level may be reduced, decreased, or modulated by Pulse Width Modulation (PWM). Pulse Width Modulation (PWM) is a method of decreasing or reducing a power supply delivered to the thermal system, heating system, and/or cooling system by quicky modulating or turning on and off or reducing or increasing the power supply. For example, the power supply may be reduced, decreased, or modulated to less than about 100%, less than or equal to about 90%, less than or equal to about 80%, less than or equal to about 70%, less than or equal to about 60%, less than or equal to about 50%, less than or equal to about 40%, less than or equal to about 30%, less than or equal to about 20%, less than or equal to about 10%, less than or equal to about 5%. For example, the power supply may be decreased or modulated to a range between about 10% and 40%. The power supply levels in step 110 may be changed over time, depending on the structure and materials of the touch surface and/or assembly, wear conditions associated with the touch surface and/or assembly, and/or occupant preferences.

The control method 100 may include a step 112. In or during step 112, the control method 100 may include detecting, measuring, or determining a temperature of the touch surface (i.e., a feedback temperature ($T_{m2}$)). The feedback temperature ($T_{m2}$) may be defined as the temperature of the touch surface after the power savings mode or operation in step 110 has been supplied to the touch surface or thermal system 20. The control method 100 may perform this determination with a timer, thermometer, thermostat, power supply, look up table, algorithm, computer software, or a combination thereof. Because the power level supplied to the thermal system 20 during the power savings mode or operation in step 110 is less than, reduced, or lowered relative to the power level supplied to the thermal system 20 during step 104, if operating in a heating mode, the measured or detected feedback temperature ($T_{m2}$) should be lower than the measured or detected surface temperature ($T_{m1}$) from step 106. On the other hand, if operating in a cooling mode, the measured or detected feedback temperature ($T_{m2}$) should be greater than the measured or detected surface temperature ($T_{m2}$) from step 106.

If operating in a heating mode, the step 112 includes comparing the detected or measured feedback temperature ($T_{m2}$) to a lower threshold temperature for reduced heating ($T_{HMin}$). The lower threshold temperature for reduced heating ($T_{HMin}$) may be a predetermined minimum temperature of the touch surface that may be dependent on the region of the touch surface, the materials of the touch surface, and/or wear conditions associated with the touch surface. The lower threshold temperature for reduced heating ($T_{HMin}$) may be a predetermined minimum temperature that should not be greatly exceeded for an extended period of time or else occupant thermal discomfort may occur.

If during a heating mode it is determined at step 112 that the feedback temperature ($T_{m2}$) is not greater than or equal to the lower threshold temperature for reduced heating ($T_{HMin}$), then the control method 100 proceeds to step 114 discussed below. If during the heating mode it is determined that the feedback temperature ($T_{m2}$) is greater than or equal to the lower threshold temperature for reduced heating ($T_{HMin}$), then the control method 100 proceeds to step 116.

If operating in a cooling mode, step 112 includes comparing the feedback temperature ($T_{m2}$) to an upper threshold temperature for reduced cooling ($T_{CMax}$). The upper threshold temperature for reduced cooling ($T_{CMax}$) may be a predetermined maximum temperature of the touch surface that may be dependent on the region of the touch surface, the materials of the touch surface, and/or wear conditions associated with the touch surface. The upper threshold temperature for reduced cooling ($T_{CMax}$) may be a predetermined maximum temperature that should not be greatly exceeded for an extended period of time or else occupant thermal discomfort may occur.

If during a cooling mode it is determined at step 112 that the measured or determined feedback temperature ($T_{m2}$) is not less than or equal to upper threshold temperature for reduced cooling ($T_{CMax}$) during a cooling mode, then the control method 100 proceeds to step 114. If during a cooling mode it is determined that the feedback temperature ($T_{m2}$) is less than or equal to the upper threshold temperature for reduced cooling ($T_{CMax}$), then the control method 100 proceeds to step 116.

The control method 100 may include a step 114. At step 114, the power savings mode from 110 is discontinued and the control method 100 proceeds or reverts back to step 104, where the power level is increased to increase the temperature of the touch surface during a heating mode or decrease the temperature of the touch surface when operating in a cooling mode.

The control method 100 may include a step 116. At step 116, the control method 100 may compare the elapsed time (t) from the timer, which was activated at step 108, to a predetermined maximum time ($t_{Max}$). If it is determined that the elapsed time (t) is less than the predetermined maximum time ($t_{Max}$), then the control method 100 proceeds to step 118. If it is determined during step 116 that the elapsed time (t) is not less than the predetermined maximum time ($t_{Max}$) (i.e., the elapsed time (t) is greater than or equal to the predetermined maximum time ($t_{Max}$)), then the method 100 proceeds to step 114. The purpose of step 116 is to prevent the control method 100 or thermal system 20 for operating in the power savings mode for an extended period of time. Doing so during a heating mode, may cause the touch surface to become exceptionally cool, which may be felt by the occupant or thermoreceptors, and which may lead to occupant thermal discomfort. If operating in a cooling mode and the thermal system 20 or control method 20 operates in the power savings mode for an extended period of time, the touch surface to become exceptionally warm, which may be felt by the occupant or thermoreceptors, and which may lead to occupant thermal discomfort.

The control method 100 may include a step 118. At step 118, the control method 100 and/or thermal system 20 may begin determining or calculating the temperature rate of change (dT/dt) of the touch surface. At step 118, an initial temperature value ($t_i$) for rate of change calculation is set to the feedback temperature ($T_{m1}$) that was determined at step 112.

The control method 100 may include a step 120. At step 120, a time for the rate of change calculation is set to a time delay valve ($t_{Delay}$) that may be dependent on the structure and materials of the touch surface and/or assembly, wear conditions associated with the touch surface and/or assembly, and/or occupant preferences.

The control method 100 may include a step 122. At step 122, a final temperature value ($t_f$) for rate of change calculation is set to the feedback temperature ($T_{m2}$) that was determined at step 112.

The control method 100 may include a step 124. At step 124, the method 100 determines or calculates the temperature rate of change (r, dT/dt) of the touch surface. The temperature rate of change of the touch surface (r) may be determined or calculated using a formula $(t_f-t_i)/t_{delay}$. The values for the rate of change calculation were described above at steps 118, 120, 122. The calculation may be performed by a computer processor or algorithm that is part of the thermal system 20, vehicle 10, or both.

The control method 100 may include a step 126. At step 126, the control method 100 may compare the temperature rate of change of the touch surface (r) determined at step 124 to a predetermined threshold temperature rate of change. The predetermined threshold temperature rate of change may be a rate of temperature change that is not observed or felt by an occupant. In other words, the predetermined threshold temperature rate of change is such that human thermoreceptors of the occupant do not sense or measure the change in temperature. The predetermined threshold temperature rate of change is such that the occupant does not experience thermal discomfort. The predetermined threshold temperature rate of change may change over time depending on the material of the touch surface, wear and tear of the touch surface, occupant preference, etc. For example, while operating in a heating mode, the predetermined threshold temperature rate of change may be about −0.2° C./min. For example, while operating in a cooling mode, the predetermined threshold temperature rate of change may be about +0.2° C./min. However, the predetermined threshold temperature rate of change may be greater than or less than the aforementioned values.

At step 126, if it is determined that the calculated or determined temperature rate of change of the touch surface over time (r) is less than a predetermined threshold temperature rate, then the method proceeds to step 128. If it is determined that the calculated or determined temperature rate of change of the touch surface over time (r) is not less than the predetermined threshold temperature rate, then the control method 100 proceeds to step 130 discussed below.

The control method 100 may include a step 128. If operating in a heating mode and the control method 100 proceeds to step 128, then it means that rate of temperature change of the touch surface is occurring too rapidly or too quickly. In other words, if the control method proceeds to step 128, then it means that temperature of the touch surface is decreasing or cooling too rapidly quickly. If this occurs, then the human or occupant thermoreceptors may detect the temperature rate change and provide a negative occupant thermal comfort. Accordingly, to combat this rapid temperature change, the control method 100 may at step 128 increase or modulate the power level that was set at step 110. For example, control method 100 may increase or modulate the power level by about 1% or more, 3% or more, 5% or more, 10% or more, etc. By increasing or modulating the power level during a heating mode at step 128, the rate at which the temperature of the touch surface cools down is reduced or lowered. Preferably, the cooling rate is lowered to a rate that is undetectable by human thermoreceptors. This rate may be about 0.2° C./min or less. However, this rate may be higher or lower depending on the structure of the touch surface, occupant preference, wear and tear of the touch surface or assembly thereof, system degradation, etc.

If operating in a cooling mode and the control method 100 proceeds to step 128, then it means that rate of temperature change of the touch surface is occurring too rapidly quickly. In other words, if the control method proceeds to step 128, then it means that temperature of the touch surface is increasing or warming too rapidly or quickly. Accordingly, at step 128, to combat this rapid temperature change, the control method 100 may at step 128 increase or modulate the power level that was set at step 110. For example, control method 100 may increase or modulate the power level by about 1% or more, 3% or more, 5% or more, 10% or more, etc. By increasing or modeling the power level during a cooling mode at step 128, the rate at which the temperature of the touch surface warms up is reduced or lowered. Preferably, the warming rate is lowered to a rate that is undetectable by human thermoreceptors. This rate may be about 0.2° C./min or less. However, this rate may be higher or lower depending on the structure of the touch surface, occupant preference, wear and tear of the touch surface or assembly thereof, system degradation, etc.

After step 128, the control method 100 may revert back to step 112. The control method 100 may continue in the aforementioned loop until the control method 100 exits the power savings mode at step 114, discussed above. Then the control method 100 may revert back to step 104, where the power level is again increased or modulated to a higher level, for example 100%.

The control method 100 may include a step 130. At step 130, the control method 100 checks or determines if the power level or modulated power level is greater than 0%. If the power level or modulated power level is not greater than 0% (i.e., if the power level or modulated power level is equal to 0%), then the control method 100 reverts back to step 104, where the power level is again increased or modulated to a higher level for example 100%.

If the power level or modulated power level is greater than 0% at step 130, then the control method 100 proceeds to step 132.

The control method 100 may include a step 132. If operating in a heating mode and the control method 100 proceeds to step 132, then it means that rate of temperature change of the touch surface is occurring too slowly or not rapidly enough. In other words, if the control method proceeds to step 132, then it means that temperature of the touch surface is decreasing or cooling too slowly. Accordingly, at step 128, the control method 100 may decrease or modulate the power level that was set at step 110. For example, control method 100 may decrease or modulate the power level by about 1% or more, 3% or more, 5% or more, 10% or more, 15% or more, etc. By decreasing or modulating the power level during a heating mode at step 128, the rate at which the temperature of the touch surface cools down is increased.

If operating in a cooling mode and the control method 100 proceeds to step 132, then it means that rate of temperature change of the touch surface is occurring too slowly. In other words, if the control method proceeds to step 132, then it means that temperature of the touch surface is increasing or warming too slowly. Accordingly, at step 132, the control method 100 may decrease or modulate the power level that was set at step 110. For example, control method 100 may decrease or modulate the power level by about 1% or more, 3% or more, 5% or more, 10% or more, 15% or more, etc. By decreasing or modulating the power level during a heating mode at step 128, the rate at which the temperature of the touch surface increases is increased.

After step 132, the control method 100 may revert back to step 112. The control method 100 may continue in the aforementioned loop until the control method 100 exits the power savings mode at step 114. Then the control method 100 reverts back to step 104, where the power level is again increased or modulated to 100%.

Figure 4:
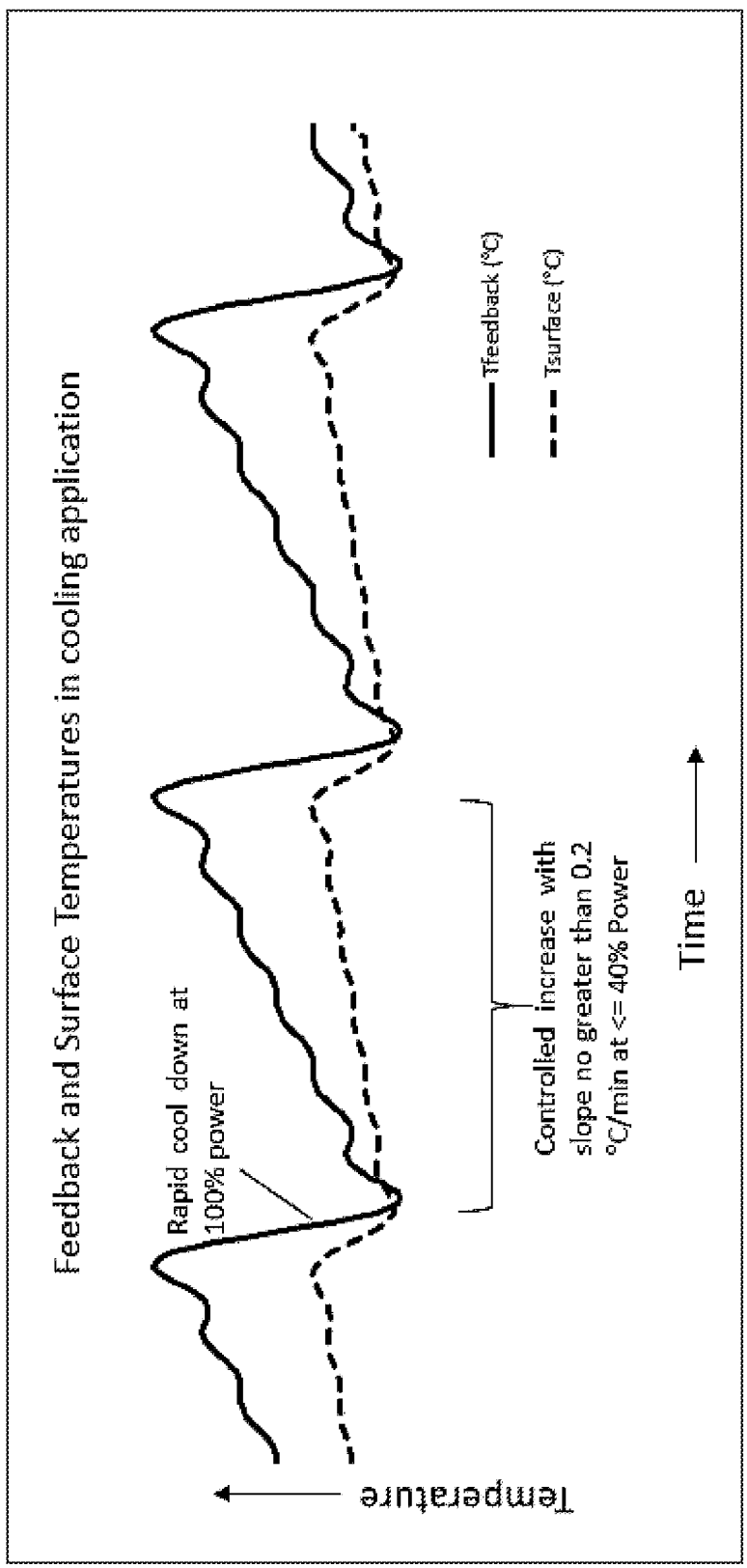
FIG. 4 shows a graph of a temperature profile of a touch surface while the thermal system operates in a heating mode.

FIG. 4 shows a graph of the temperature profile of a touch surface while the thermal system operates in a heating mode using the control method 100.

Figure 5:
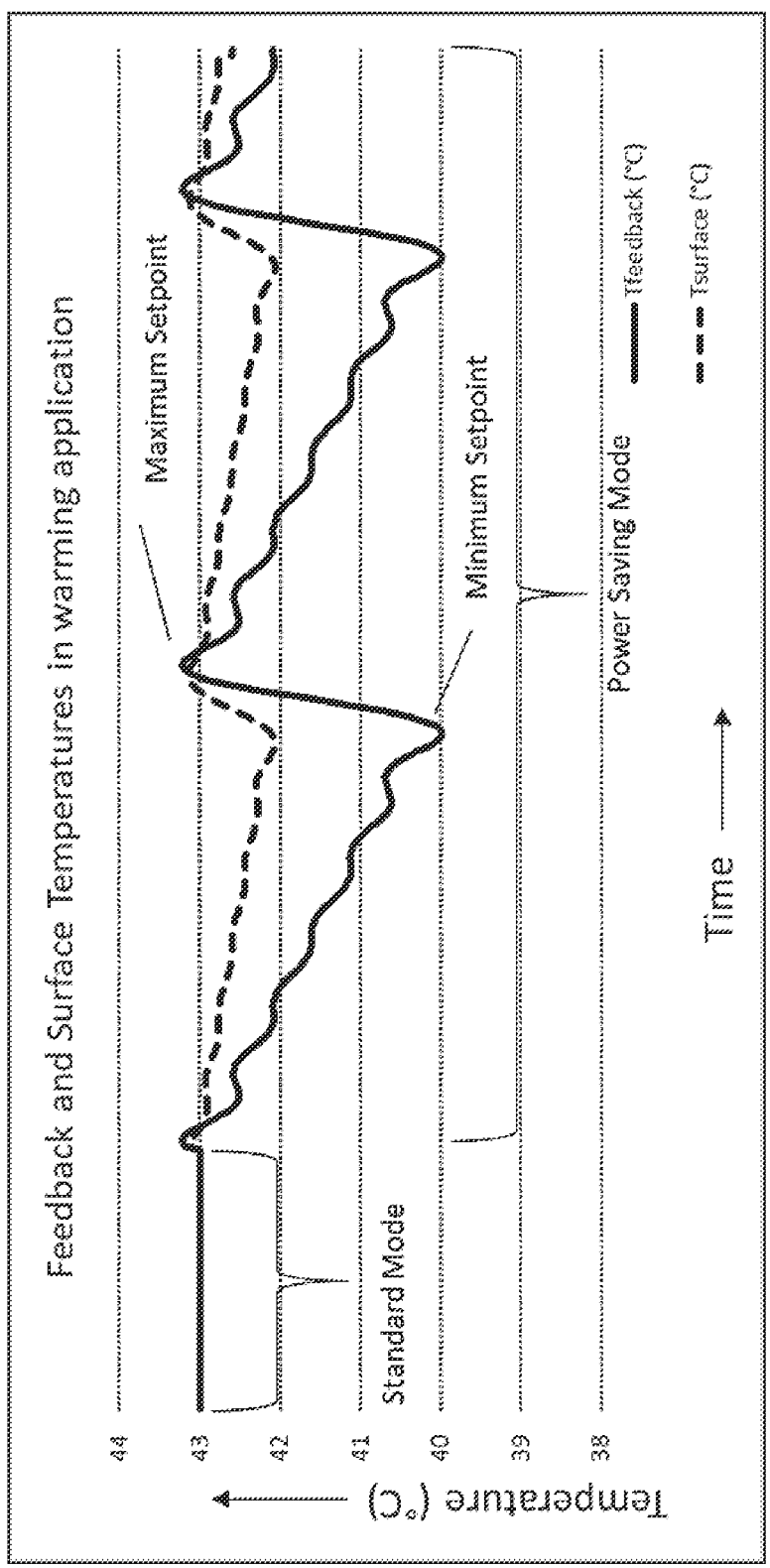
FIG. 5 shows a graph of a temperature profile of a touch surface while the thermal system operates in a heating mode.

FIG. 5 shows a graph of the temperature profile of a touch surface while the thermal system operates in a heating mode using the control method 100.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A method of controlling a thermal system, comprising:
supplying an amount of power to the thermal system to effect a temperature change of a touch surface;
determining a temperature rate of change of the touch surface after the supplying step;
comparing the determined temperature rate of change of the touch surface to a threshold temperature rate of change;
running a power savings mode to effect a change in surface temperature of the touch surface, the power savings mode comprises reducing the amount of power supplied to the thermal system; wherein during the power savings mode, the change in the surface temperature of the touch surface is controlled so that an occupant or an occupant's thermal receptors do not detect the temperature change;
determining a temperature rate of change of the touch surface after the running of the power savings mode, and comparing the determined temperature rate of change of the touch surface after the running of the power savings mode to the threshold temperature rate of change,
wherein when the determined temperature rate of change of the touch surface after the running of the power savings mode is greater than the threshold temperature rate of change, then the method is configured to change or modulate the amount of power that is supplied to the thermal system to reduce the temperature rate of change, and when the determined temperature rate of change of the touch surface after the running of the power savings mode is less than the threshold temperature rate of change, then the method is configured to increase or modulate the amount of power supplied to the thermal system by returning to the supplying step.

2. The method according to claim 1, wherein the power is increased when the determined temperature rate of change of the touch surface after the running of the power savings mode is less than the threshold temperature rate of change.

3. The method according to claim 1, wherein the power is decreased when the determined temperature rate of change of the touch surface after the running of the power savings mode is not less than the threshold temperature rate of change.

4. The method according to claim 1, wherein the method comprises a step of: turning ON the thermal system; and the supplying or increasing step comprises: supplying a first power level to the thermal system and supplying a second power level to the thermal system that is different than the first power level, wherein the method comprises a step of: decreasing the first power level to the second power level when the determined temperature rate of change of the touch surface after the running of the power savings mode is greater than or equal to the threshold temperature rate of change, or the method comprises a step of: increasing the first power level to the second power level when the determined temperature rate of change of the touch surface after the running of the power savings mode is less than or equal to the threshold temperature rate of change.

5. The method according to claim 4, wherein the method comprises: setting a timer and monitoring an elapsed time.

6. The method according to claim 5, wherein the method comprises comparing the elapsed time to a predetermined time period and terminating the step of supplying the second power level to the thermal system after the elapsed time exceeds the predetermined time period.

7. The method according to claim 6, wherein the comparing of the elapsed time to the predetermined time period occurs before the step of determining the temperature rate of change of the touch surface after the running of the power savings mode.

8. The method according to claim 4, wherein the second power level is pulse width modulated at a rate between about 10% and 40%.

9. A vehicle seat comprising the touch surface and the thermal system is configured to effect the temperature change of the touch surface according to the method of claim 1.

10. The method according to claim 1, wherein during or after the step of running the power savings mode, the method comprises measuring a feedback temperature of the touch surface, and then determining when the feedback temperature is less than or greater than a predetermined temperature threshold.

11. The method according to claim 10, wherein after the step of determining when the feedback temperature is less than or greater than the predetermined temperature threshold, the method comprises discontinuing the step of running the power savings mode and resuming the supplying step.

12. The method according to claim 1, wherein the touch surface is part of one or more vehicle seats, a vehicle dashboard, a vehicle steering wheel, a vehicle center console, a vehicle cup holder, a vehicle door panel, a vehicle headliner, and/or one or more vehicle floor mats.

13. The method according to claim 1, wherein the touch surface is part of a non-vehicular application selected from a list comprising: a couch, a recliner, surface inside of a residence, office building, hotel, restaurant, or a combination thereof.

14. A method of controlling a thermal system, comprising:
supplying an amount of power to the thermal system to effect a temperature change of a touch surface;
determining a surface temperature of the touch surface;
comparing the determined surface temperature of the touch surface to a first threshold temperature, and when the determined surface temperature of the touch surface is greater than the first threshold temperature then the method comprises: running a power savings mode to effect a change in the surface temperature of the touch surface where the amount of power that is supplied to the thermal system is reduced and less than the amount of power supplied during the supplying step, wherein the change in the surface temperature of the touch surface during the running of the power savings mode is controlled so that an occupant or an occupant's thermal receptors do not detect the temperature change;

determining a feedback temperature of the touch surface during the running of the power savings mode, comparing the feedback temperature of the touch surface to a second threshold temperature and then either ending the running of the power savings mode and returning to the supplying step, or determining a temperature rate of change of the touch surface, wherein an initial temperature value for the temperature rate of change calculation is the feedback temperature;

comparing the determined temperature rate of change of the touch surface to a threshold temperature rate of change, wherein the threshold temperature rate of change is a rate of change that is predetermined to not be detected or felt by the occupant or the occupant's thermal receptors;

wherein when the determined temperature rate of change is greater than the threshold temperature rate of change then the method is configured to change or modulate the amount of power that is supplied to the thermal system to reduce the temperature rate of change, and when the determined temperature rate of change is less than the threshold temperature rate of change then the method is configured to return to the supplying step.

15. The method according to claim 14, wherein the touch surface is part of one or more vehicle seats, a vehicle dashboard, a vehicle steering wheel, a vehicle center console, a vehicle cup holder, a vehicle door panel, a vehicle headliner, and/or one or more vehicle floor mats.

16. The method according to claim 14, wherein the touch surface is part of a non-vehicular application selected from a list comprising: a couch, a recliner, surface inside of a residence, office building, hotel, restaurant, or a combination thereof.

* * * * *